C. WRIGHT.
REGISTER.
APPLICATION FILED AUG. 27, 1909.
964,356.
Patented July 12, 1910.
4 SHEETS—SHEET 1.
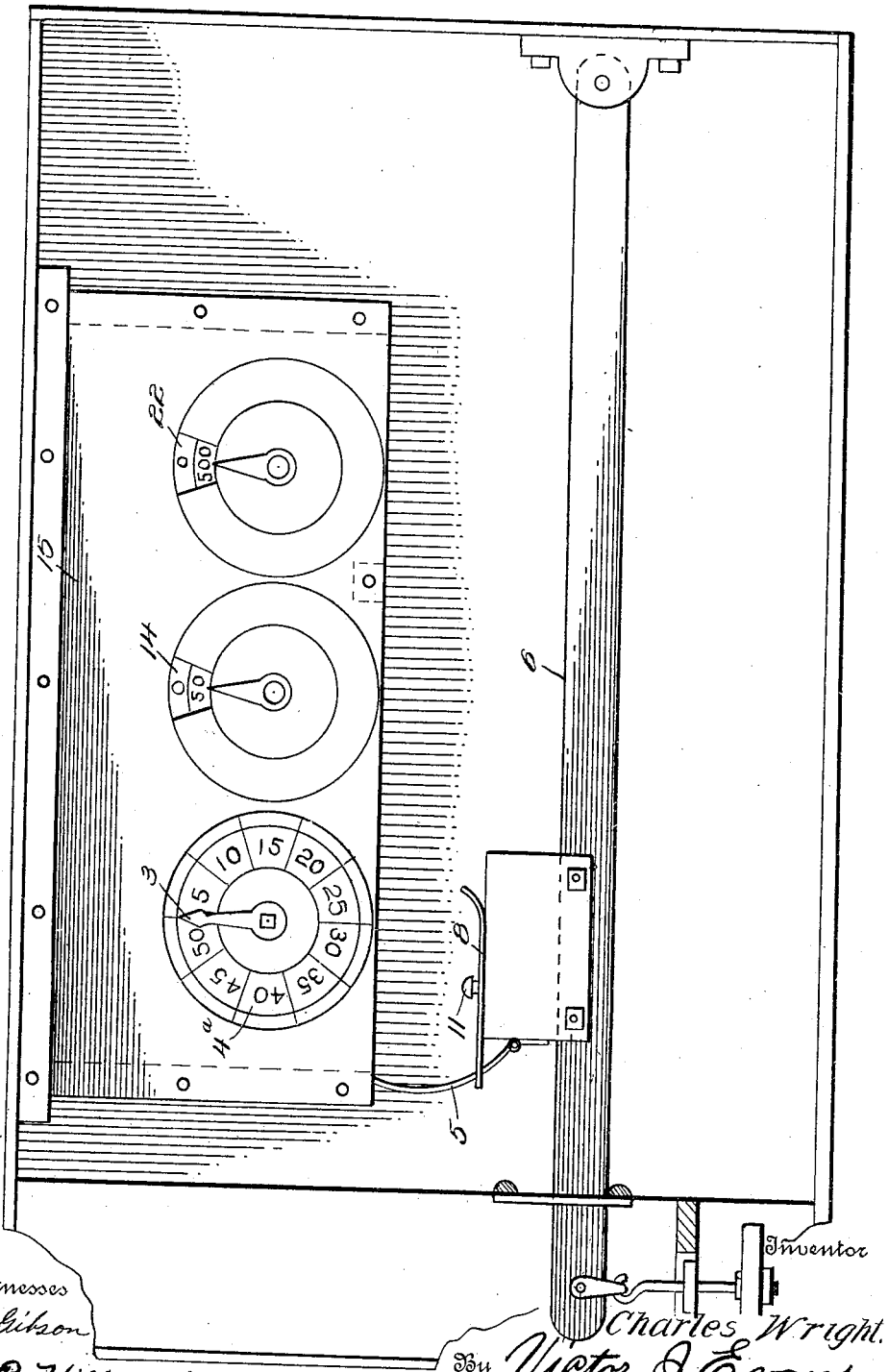
Witnesses
T. C. Gibson
V. B. Hillyard.
Inventor
Charles Wright.
By Victor J. Evans
Attorney

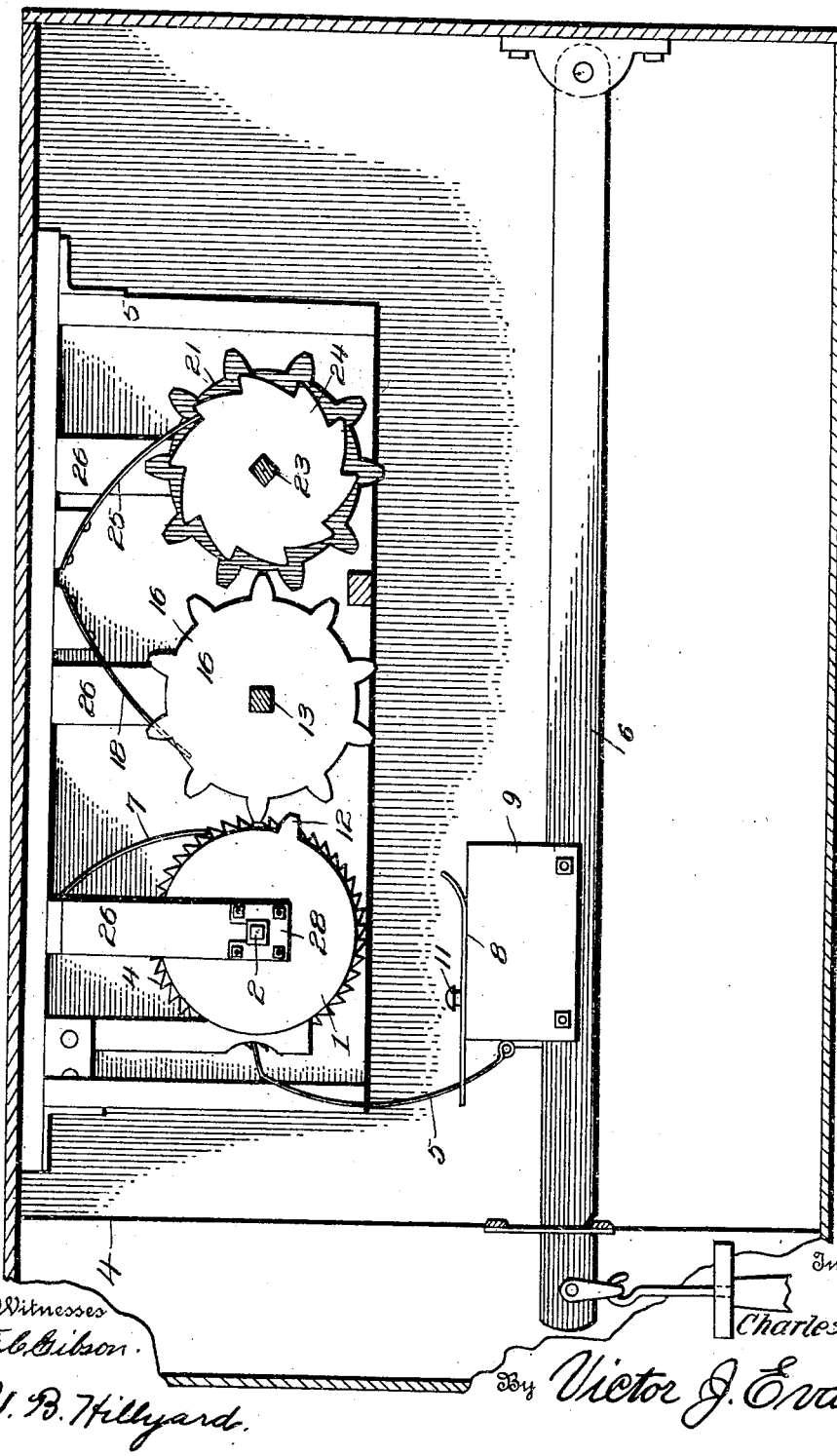

C. WRIGHT.
REGISTER.
APPLICATION FILED AUG. 27, 1909.
964,356.
Patented July 12, 1910.
4 SHEETS—SHEET 3.
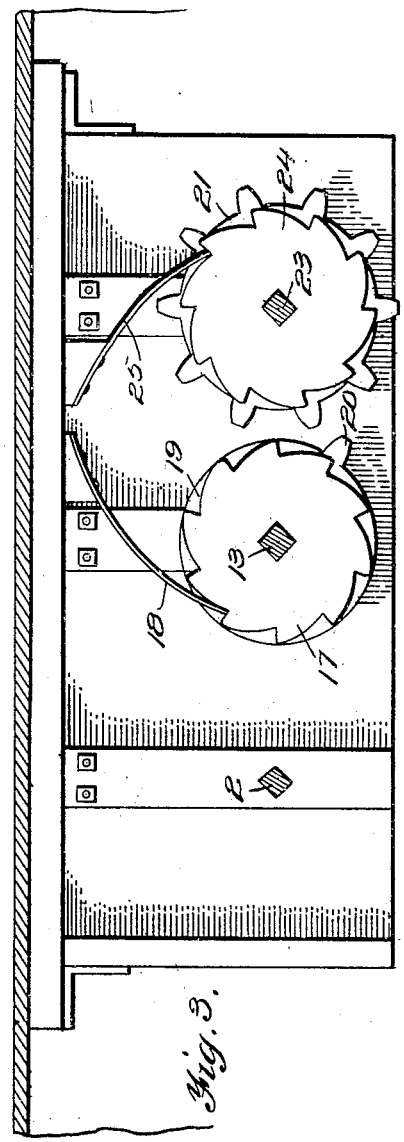
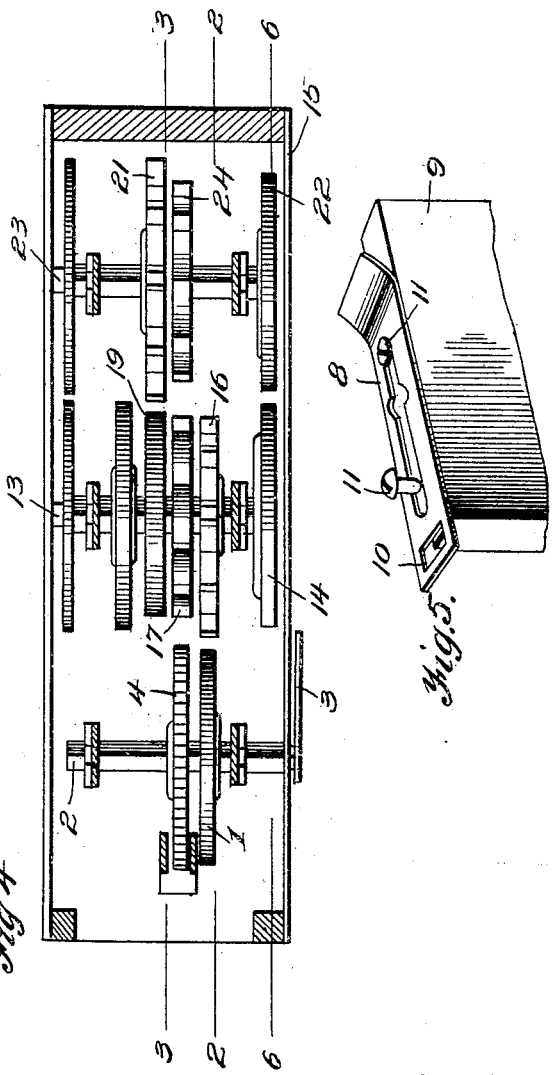
Witnesses
F. C. Gibson.
V. B. Hillyard.
Inventor
Charles Wright
By Victor J. Evans
Attorney

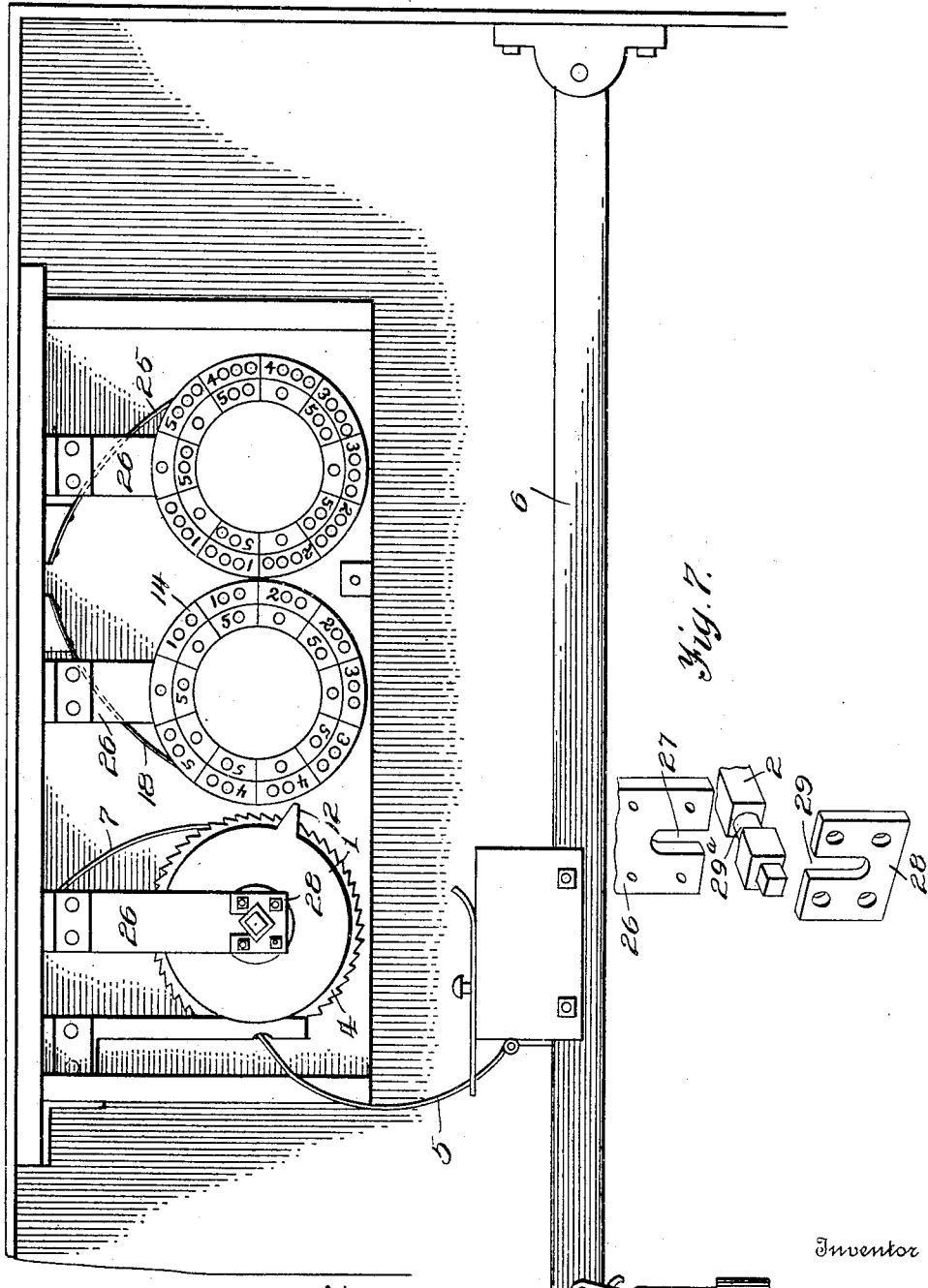

UNITED STATES PATENT OFFICE.

CHARLES WRIGHT, OF HOMINY, OKLAHOMA.

REGISTER.

964,356.  Specification of Letters Patent. Patented July 12, 1910.

Application filed August 27, 1909. Serial No. 514,923.

*To all whom it may concern:*

Be it known that I, CHARLES WRIGHT, a citizen of the United States, residing at Hominy, in the county of Osage and State of Oklahoma, have invented new and useful Improvements in Registers, of which the following is a specification.

The present invention provides a mechanism for keeping tally or registering any number of units or operations and preserving a sum total of each movement of the mechanism corresponding to the article or unit serving to actuate the mechanism at the beginning or initial step.

The invention provides a mechanism of the character and for the purpose aforesaid, which may be used generally for recording movements of any nature.

In its specific adaptation the invention is illustrated in connection with a weighing beam for registering the movements of the beam, thereby recording the number of units of measure. This is particularly advantageous for weighing grain or other product or commodity, whereby the bulk run through any machine or handled may be determined and ascertained at a moment's notice.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a front view of a register or recorder constructed in accordance with and embodying the essential features of the invention. Fig. 2 is a view similar to Fig. 1 with the front portion removed on the section line 2—2 of Fig. 4. Fig. 3 is a sectional view on the line 3—3 of Fig. 4. Fig. 4 is a horizontal section on the line 4—4 of Fig. 2. Fig. 5 is a detail perspective view of the upper portion of the block and the guide slidably mounted thereon for controlling the movements of the operating pawl. Fig. 6 is a view similar to Fig. 1 with the front removed on the line 6—6 of Fig. 4. Fig. 7 is a perspective view of an end portion of one of the shafts and the bearing therefor, the parts being separated and arranged in a group.

Corresponding and like parts are referred to in the following description, and indicated in all the views of the drawings, by the same reference characters.

The operating mechanism is suitably housed and comprises registering wheels supporting shafts and indicating hands and dials. It is to be understood that each registering wheel may be adapted to indicate any number of units. In the present instance the registering wheels are numbered to record or indicate fifty units and after the units wheel has made a complete revolution it actuates and moves the tens wheel one step and after the tens wheel has completed a revolution it moves the hundredths wheel one step. The units wheel is designated by the numeral 1 and is fast to a shaft 2, which is mounted in suitable bearings. The shaft 2 is provided at its outer end with an indicating hand 3, which moves over a dial 4ª upon the front of the housing or casing inclosing the operating parts. A ratchet wheel 4 is fast to the shaft 2 so as to rotate therewith and with the units wheel 1. The ratchet wheel 4 is provided with fifty teeth, each corresponding with a unit or degree of movement of the units wheel at each operation thereof. The units wheel is moved forward step-by-step by means of an operating pawl 5, which is connected to an operating member, which in the present instance consists of a weighing beam 6. The operating pawl 5 consists of a spring arm and is arranged to engage with the teeth of the ratchet wheel 4, so as to move said ratchet wheel forward the distance of one tooth at each complete movement of the operating member 6. A detent pawl 7 prevents backward movement of the ratchet wheel and is adapted to engage the teeth thereof. When the operating member 6 moves downward or in one direction the pawl 5 is caused to ride upon a tooth of the ratchet wheel 4 and upon upward movement of the operating member 6 the actuating pawl 5 engages a tooth of the ratchet wheel 4 and rotates said ratchet wheel a distance corresponding to the length of the tooth, thereby bringing the next number in position for recording movement. A guide 8 is slidably mounted upon a block or support 9 and is provided at one end with an opening 10, through which the actuating pawl 5 passes. The guide 8 is secured in position by suitable fastenings 11. By proper adjustment of the guide 8 the actuating pawl 5 may be adjusted with reference to the teeth of the ratchet wheel 4, so as to insure movement of the ratchet wheel on each operation a distance corresponding to the length of a tooth. The units wheel 1 is provided with a projection 12, which is adapted to engage with a tooth of the hundredths wheel, so as to move the latter forward a distance to bring the next number in proper position for observation to indicate correct registration.

A shaft 13 paralleling the shaft 2 and mounted in suitable bearings is provided with a series of disks or wheels. The tens wheel 14 is fast to the outer end of the shaft 13 and is provided with numbers in multiples of fifty, so that at each complete revolution of the units wheel the tens wheel is moved a distance to bring the next number in position to be read through an observation opening provided in the front 15 of the housing or casing. A toothed wheel 16 is mounted upon a shaft 13 in the plane of the units wheel 1 and its teeth are adapted to be engaged by the projection 12 of said units wheel 1. A ratchet wheel 17, fast upon the shaft 13, is adapted to coöperate with a detent pawl 18, so as to prevent backward rotation of the tens wheel after the same has been moved forward. A wheel 19, fast upon the shaft 13, is provided with a projection 20 adapted to engage the teeth of a toothed wheel 21, so as to turn the latter forward a distance corresponding to the space between the teeth at each complete revolution of the tens wheel.

The hundredths wheel 22 is fast to a shaft 23 paralleling the shafts 2 and 13 and mounted in suitable bearings. The toothed wheel 21 is fast to the shaft 23 to rotate therewith. A ratchet wheel 24, fast to the shaft 23, is adapted to coöperate with a detent pawl 25, so as to prevent backward rotation of the shaft 23. The units wheel registers fifty, the tens wheel five hundred, divided into numbers representing fifty at each movement and the hundredths wheel indicates five thousand, divided into numbers of five hundred each.

It is to be understood that the registering mechanism may be incased in any suitable manner according to the machine or mechanism, the number of movements of which are to be registered. The actuating pawl 5 is adapted to be connected to the moving part, which in a weighing machine preferably consists of the scale beam 6, as indicated, said scale beam representing the operating member. At each movement of the operating member and pawl connected therewith, the units wheel is moved the distance of one tooth, thereby registering one, which is indicated by the hand 3 on the dial 4. After the units wheel has made a complete revolution the projection 12 of the wheel 1 engages a tooth of the wheel 16 and moves the tens wheel a distance corresponding to a tooth so as to bring the number fifty opposite the observation opening in the front of the casing. At each movement of the tens wheel a number corresponding to fifty is brought into position, so as to record the total number of movements of the units wheel. The hundredths wheel is moved in a like manner to the tens wheel and indicates five hundred at each complete revolution of the tens wheel.

In order that the several shafts may be readily placed in position or quickly removed for any purpose they are mounted in bearings, which are shown most clearly in Fig. 7. The bearing comprises a hanger 26, which is formed in an end with an open slot 27. A plate 28, having an open slot 29 in an edge, is adapted to be secured against a side of the hanger 26 and close the open end of the slot 27. The shaft indicated generally by the reference numeral 2 has a portion reduced, as indicated at $29^a$, to obtain a bearing in the closed ends of the hanger 26 and the part 28. When the parts are assembled longitudinal movement of the shaft is prevented by the reduced or grooved portion fitting within the closed ends of the slots 27 and 29, the shoulders formed at opposite ends of the reduced or rounded part $29^a$ engaging with the parts 26 and 28 and preventing any possible longitudinal movement of the shaft. This construction admits of the shafts being easily removed or quickly placed in position, as may be required for any desired purpose.

From the foregoing description, taken in connection with the accompanying drawings, the advantages of construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

I claim:—

A registering mechanism comprising a shaft provided with indicating means, a ratchet wheel fast to said shaft, an actuating pawl for coöperation with the ratchet wheel, an operating member for the actuating pawl, and a guide for the actuating pawl slidably mounted upon the operating member and adapted to properly position the actuating pawl with reference to the coöperating ratchet wheel, said guide having an opening through which the pawl passes, and means for securing the guide in the adjusted position.

In testimony whereof I affix my signature in presence of two witnesses.

CHARLES WRIGHT.

Witnesses:
  H. F. DISHON,
  CHAS. PETTIT.